US012091172B2

(12) United States Patent
Noppe et al.

(10) Patent No.: US 12,091,172 B2
(45) Date of Patent: Sep. 17, 2024

(54) MULTI-ROTOR HYDRAULIC DRONE

(71) Applicants: UNIVERSITÉ DE TECHNOLOGIE DE COMPIÈGNE (UTC), Compiègne (FR); CENTRE NATIONAL DE LA RECHERCHE SCIENTIFIQUE (CNRS), Paris (FR)

(72) Inventors: Eric Noppe, Compiègne (FR); Jérôme Demiras, Compiègne (FR)

(73) Assignees: UNIVERSITÉ DE TECHNOLOGIE DE COMPIÈGNE (UTC), Compiègne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 171 days.

(21) Appl. No.: 17/787,409

(22) PCT Filed: Dec. 17, 2020

(86) PCT No.: PCT/EP2020/086765
§ 371 (c)(1),
(2) Date: Jun. 20, 2022

(87) PCT Pub. No.: WO2021/122990
PCT Pub. Date: Jun. 24, 2021

(65) Prior Publication Data
US 2023/0020058 A1 Jan. 19, 2023

(30) Foreign Application Priority Data
Dec. 20, 2019 (FR) ..................... 1915355

(51) Int. Cl.
*B64C 39/02* (2023.01)
*B64D 27/02* (2006.01)
(Continued)

(52) U.S. Cl.
CPC .......... *B64C 39/024* (2013.01); *B64C 39/022* (2013.01); *B64D 27/02* (2013.01);
(Continued)

(58) Field of Classification Search
CPC ..... B64C 39/022; B64C 39/024; B64D 27/02; B64D 35/04; B64D 35/08; B64D 37/02;
(Continued)

(56) References Cited

U.S. PATENT DOCUMENTS 1,939,156 A   12/1933  Wright
2,917,026 A * 12/1959  Hall ................... F15B 13/0402
                                                        91/359
(Continued)

FOREIGN PATENT DOCUMENTS

CN    104760699 A    7/2015
EP    3450312 A1    3/2019
(Continued)

OTHER PUBLICATIONS

International Search Report and Written Opinion for counterpart Application No. PCT/EP2020/086765, dated Feb. 4, 2021.
(Continued)

*Primary Examiner* — Brady W Frazier
(74) *Attorney, Agent, or Firm* — THE MARBURY LAW GROUP, PLLC

(57) ABSTRACT

Multi-rotor hydraulic drone (1) comprising: —a plurality of hydraulic motors (6) each receiving a pressurised fluid, —propellers (5) driven by the hydraulic motors (6), —at least one hydraulic pump (10) driven by at least one motor (11) for pressurising the fluid, —a system for supplying the hydraulic motors (6) with pressurised fluid, —a flight controller (14) for controlling the supply system according to the desired rotation speed for the hydraulic motors (6), the supply system comprising several channels (35; 36; 37; 38)

(Continued)

for adjusting the power of at least one portion of the hydraulic motors (6).

17 Claims, 13 Drawing Sheets

(51) Int. Cl.
*B64D 35/04* (2006.01)
*B64D 35/08* (2006.01)
*B64D 37/02* (2006.01)
*B64F 1/36* (2024.01)
*B64U 30/20* (2023.01)
*F15B 11/042* (2006.01)
*F15B 11/16* (2006.01)
*B64U 50/19* (2023.01)
*B64U 50/34* (2023.01)

(52) U.S. Cl.
CPC .............. *B64D 35/04* (2013.01); *B64D 35/08* (2013.01); *B64D 37/02* (2013.01); *B64F 1/362* (2013.01); *F15B 11/042* (2013.01); *F15B 11/16* (2013.01); *B64U 30/20* (2023.01); *B64U 50/19* (2023.01); *B64U 50/34* (2023.01); *F15B 2211/6651* (2013.01)

(58) Field of Classification Search
CPC ........ B64F 1/362; F15B 11/042; F15B 11/16; B64U 30/20; B64U 50/19; B64U 50/34
USPC ....................................................... 244/17.13
See application file for complete search history.

(56) References Cited

U.S. PATENT DOCUMENTS

| | | | |
|---|---|---|---|
| 3,345,016 A | | 10/1967 | Eickmann |
| 3,503,574 A | * | 3/1970 | Eickmann .............. B64U 10/60 |
| | | | 244/17.17 |
| 4,086,768 A | * | 5/1978 | Eickmann .............. B63H 23/26 |
| | | | 60/486 |
| 4,557,438 A | * | 12/1985 | Eickmann .............. B60K 17/10 |
| | | | 244/60 |
| 8,955,797 B2 | * | 2/2015 | Buono ....................... F04B 9/08 |
| | | | 244/60 |
| 2009/0100829 A1 | * | 4/2009 | Boeijen ..................... A63G 7/00 |
| | | | 104/53 |
| 2018/0016022 A1 | * | 1/2018 | Ljung .................... B64U 10/25 |
| 2019/0071172 A1 | * | 3/2019 | Caldwell ................. B64C 27/52 |
| 2020/0182262 A1 | * | 6/2020 | Blackwell ................. B60T 7/12 |
| 2022/0059251 A1 | * | 2/2022 | Kaneko ................ H01B 7/0009 |

FOREIGN PATENT DOCUMENTS

| | | |
|---|---|---|
| GB | 1146630 A | 3/1969 |
| WO | 2016/068767 A1 | 5/2016 |
| WO | 2019/074860 A1 | 4/2019 |

OTHER PUBLICATIONS

Purdue News Service: "Advancement in Driverless Aircraft Could Direct the Future of Drones Flight," Purdue University News, XP055724155, May 9, 2019; https://www.purdue.edu/newsroom/releases/2019/Q2/uising-the-power-of-fluid-for-the-future-of-drones-flight.html [extrait le Aug. 20, 2020].

* cited by examiner

MULTI-ROTOR HYDRAULIC DRONE

CROSS REFERENCE TO RELATED APPLICATIONS

This is a national stage application of PCT/EP2020/086765, filed internationally on Dec. 17, 2020, which claims priority to French Application No. 1915355, filed on Dec. 20, 2019, which are incorporated by reference herein in their entireties.

TECHNICAL FIELD

The present invention relates to a hydraulic drone.

PREVIOUS TECHNIQUE

Electrically powered drones have experienced significant in recent years, with advances in batteries and on-board electronics.

It has been proposed, for surveillance applications in particular, to supply the drone with electrical energy via a cable connected to the ground. The electric motors for providing the lift of the drones experience strong variations of current, according to the needs for stabilization. Thus, the power electronics associated with this type of motor are not designed to operate continuously for a very long time, which involves frequent maintenance operations, and, lastly, the flight time is not as long as desired.

U.S. Pat. No. 3,345,016 describes a hydraulic drone comprising hydraulic motors, where the rotation speed of each motor is controlled by varying the flow rate of fluid to the motor via a 'short-circuit' system between the fluid supply and return lines of the motor. Such a circuit results in a loss of power through energy dissipation in the short circuit, and it is impossible to precisely control the motor speed. Indeed, the centralized control of the opening rates of the four short circuits does not ensure any proportionality insofar as the flow rate in each short circuit depends on the opening rate but also on the pressure. The pressure, however, is representative of the resisting torque of the propeller and is therefore variable with the rotation speed and consequently the flow rate.

Application WO 2019/074860 describes a hydraulic drone comprising variable displacement hydraulic motors, the rotation speed of each motor being controlled by varying the displacement of the motor and not by varying the fluid supply flow rate to the motor, which remains constant. The design of the motors is complex due to the displacement control. The speed control of the propeller is also complex insofar as the speed is not determined directly by the flow rate, but indirectly by the resistive torque and the displacement.

There is a need to overcome some of the disadvantages of the known drones, mentioned above, in particular to reduce their weight in order to increase their carrying capacity, to improve the precision of the control of the rotation speed of the hydraulic motors, and to meet the demand for reliability and responsivity of this type of drone.

DISCLOSURE OF THE INVENTION

The invention aims to satisfy this need and, according to a first of its aspects, relates to a multi-rotor hydraulic drone comprising:
a plurality of hydraulic motors each receiving a pressurized fluid,
propellers driven by the hydraulic motors,
at least one hydraulic pump driven by at least one motor for pressurizing the fluid,
a system for supplying the hydraulic motors with pressurized fluid,
a flight controller for operating the supply system according to the desired rotation speed for the hydraulic motors,
the supply system comprising a plurality of paths for adjusting the power of at least some of the hydraulic motors, with at least one, in particular electrically, controllable valve for at least some of the paths, making it possible to vary a supply flow rate of at least one corresponding hydraulic motor according to the speed required of this hydraulic motor, the supply flow rate of the hydraulic motor increasing when the controllable valve passes from a first position to a second position of greater opening than the first, the fluid flow rate received by at least one of the hydraulic motors when the controllable valve is in the first position being non-zero.

The invention makes it possible to benefit from the reliability of hydraulic motors, as well as their good power/weight ratio. The control paths of the motors, by ensuring an adjustment from a given operating point, corresponding to the first position of the valve, offer a good responsivity of the control and allow the use of valves of reduced weight, requiring a reduced power for their control.

The hydraulic motor that receives a non-zero fluid flow rate when the controllable valve is in the first position is preferably connected in series with this controllable valve.

The non-zero flow rate can then be obtained by a bypass in parallel with the controllable valve, contributing at least partially, in particular at least for half, to the fluid flow rate received by the hydraulic motor when the controllable valve is in the first position. The controllable valve may be closed in the first open position and the non-zero flow rate then received by the hydraulic motor may come entirely from the bypass. Preferably, this bypass has a calibrated orifice. In a variant, the non-zero flow rate is obtained by way of a leakage flow from the valve when the latter is in the first position; in this case, the first position does not correspond to a complete closure of the valve. In a further variant, the non-zero flow rate that the motor receives when the valve is in the first position may come partly from the bypass and partly from the leakage flow from the valve. The supply system can be arranged such that the non-zero fluid flow rate received by at least one of the hydraulic motors when the controllable valve is in the first position is a predefined idle flow rate. The rotation speed of the one or more hydraulic motors receiving the predefined idle flow rate can produce a sufficient thrust to ensure the lift of the drone.

In a variant, the drone can comprise a hydraulic orientation motor connected in series with the controllable valve and a hydraulic lift motor supplied with fluid removed upstream of the controllable valve and receiving a non-zero flow rate when the controllable valve is in the first position.

When the valve is in the first position, the speed of the hydraulic motor can be defined by a pressure limiter, which caps the fluid pressure at a predefined value.

The pump can be operated at a fixed speed, or alternatively at a variable speed.

Multi-Rotor Drone

A drone comprising 4 or more rotors is particularly suitable for hovering or quasi-hovering because of the distribution of the lift in the horizontal plane.

Each rotor of the drone comprises a propeller driven by a hydraulic motor. The latter is preferably of fixed displacement. The drive is preferably direct. In a variant, at least some of the motors can have a gear train to reduce the rotation speed. Preferably, the propellers are of fixed pitch. They can be two-blade, three-blade, or more.

The variation of the flow rate in each motor due to the varied extent of the opening of the valve, placed in series with the motor, may be the only way to adjust the orientation of the drone.

Hydraulic Drone

The term "hydraulic drone" shall be understood to mean a drone comprising one or more rotors of which the rotation is ensured by one or more hydraulic motors. The control of the rotation speed of each rotor is then preferably ensured by adjusting the flow rate of the supply to the motor.

Compared to a drone for which the control of the propeller rotation speed is ensured by electric motors (also called "electric drone"), the use of hydraulic motors makes it possible to considerably improve the reliability because the modulation of power necessary to control the drone can be realized by hydraulics rather than by electronic components. This overcomes the weakness of the electronic components usually used in electric drones, which have a limited life span due to the variations in intensity generated by the sudden power variations necessary to control the drone.

The drone can be configured to fly at a maximum altitude of 200 meters, preferably 150 meters, even more preferably at an altitude of between 80 and 100 meters.

The drone without its propellers can be inscribed in a square of side length ranging between 0.75 and 1.25 m, although the invention is not limited to particular dimensions.

When the drone is wired, its weight is preferably less than or equal to 25 kg.

When the drone is not wired, its weight is preferably less than or equal to 8 kg.

Wired Drone

The drone may be wired or not, but preferably is wired.

The term "wired drone" shall be understood to mean a drone connected to the ground by a cable (also called an umbilical cable) allowing in particular the transmission of energy such as electricity from the ground to the drone and/or the transmission of data from the ground to the drone, and vice versa.

A wired drone has the advantage of having a prolonged energy autonomy, which can allow it to carry out flights of long duration, i.e., of several days continuously. This is particularly desirable for observation and surveillance missions in hovering or quasi-hovering flight. Likewise, the total autonomy of the drone could be even greater by choosing components that consume little energy.

The cable can be between 2 and 250 m long, and can be wound on a reel placed on the around or installed on the drone. The reel can make it possible to keep the cable taut.

Preferably, the tension of the cable is adjusted by a drive mechanism of the reel, such that the tensile force that is exerted by the drone on the cable is constant, especially during the ascent of the drone or its descent.

The cable can comprise fiber optics, one or more twisted pairs, and/or a coaxial cable, to transmit data from the ground to the drone and back. The cable may allow for high-speed data transmission in real time, moreover permanently or periodically.

The drone can comprise on-hoard electronics configured to generate a current suitable for supplying the electrical components of the drone, and in particular the drive motor of the hydraulic pump. This motor is preferably a brushless motor, supplied with polyphase current, in particular three-phase current, from a power variator controlled by the flight controller.

On-Board Sensors

The drone can comprise any type of on-board sensor, useful for the control or mission of the drone.

The drone, in particular its flight controller, can comprise and/or can be connected to a 3-axis accelerometer, a 3-axis pyrometer, a 3-axis magnetometer, an atmospheric pressure sensor, a camera, in particular an infrared camera, an altimeter and/or a location data receiver, such as a OPS receiver. This can allow the flight controller and/or an operator on the ground to know the position, the altitude, the roll, pitch and yaw angles, and/or the speed of the drone.

The drone can comprise an on-board sensor for measuring the composition of the gaseous environment around the drone, a camera, in particular an infrared camera, a telemetric sensor, in particular an acoustic, radar and/or laser sensor, such as a lidar. This can allow surveillance missions to be carried out and a potential chemical, toxic, fire or explosion risk to be detected, for example above an industrial site.

The drone can comprise at least one temperature and pressure sensor for the fluid supplying the hydraulic motors.

The data generated by some on-board sensors can be used for different functions. For example, a camera can be used to steer the drone but can also be used to acquire images for surveillance and guarding missions.

The data generated by the on-board sensors can be transmitted to the ground by a wireless communication means and/or by a cable when the drone is wired.

Autonomous Drone

The drone can be autonomous.

The term "autonomous drone" shall be understood to mean that the drone, in particular its flight controller, comprises computer means, such as a microcomputer, which allow it to perform a certain number of functions autonomously. The drone is for example configured to perform autonomously the phases of take-off, landing, and/or hovering or quasi-hovering flight at predefined altitude.

Hydraulic Pump

Preferably, the hydraulic pump supplies pressurized fluid to the plurality of hydraulic motors.

The hydraulic pump is preferably of fixed displacement.

The drive motor of the hydraulic pump can be of variable speed.

The motor can be of any type, especially an electric motor or heat engine, it preferably being an electric motor, especially brushless, as mentioned above.

The drone may comprise a cable configured to supply electricity to the pump drive motor from the ground when the latter is electric, as mentioned above. In a variant, or additionally, the drone comprises an on-hoard battery, in particular a rechargeable battery, configured to supply electricity to the electric drive motor of the pump.

It may be advantageous for the drone to have multiple sources of electricity to power the electric drive motor of the pump, such as a cable connecting the drone to the ground and an on-hoard battery, with one of the sources being able to take over in the event of failure of the other.

The drone can comprise a tank containing fuel to power the motor when the latter is a heat engine, or a tank powering a fuel cell providing electrical power to the pump drive motor.

The drone can comprise a system for producing an air flow to cool the pump drive motor, in particular can comprise one or more fans.

The pump can be coupled to a plurality of motors to ensure its operation. This can allow one of the motors to take over in the event of failure of the other. The motors can be of the same or different types. In a variant, the hydraulic pump is coupled to a single drive motor.

The pump can be driven at a fixed speed during the flight. The pump speed is chosen to obtain the pressure necessary for correct functioning of the hydraulic motors.

One or more pressure limiters can be placed at the pump outlet and upstream of the valves, as mentioned below.

The drone can comprise a single hydraulic pump.

Hydraulic Fluid

The hydraulic fluid supplied to the hydraulic motors is preferably an oil.

This fluid can meet ISO 11158:2009, DIN 51524 and/or ASTM D6158 standards. The hydraulic fluid can be ISO 32, ISO 46 or ISO 68 grade.

Hydraulic Fluid Tank

The drone preferably comprises a storage tank containing and/or intended to receive the hydraulic fluid and allowing the hydraulic pump to be supplied with hydraulic fluid. This tank can make it possible to compensate for the variations in volume of the fluid, in particular its thermal expansion, linked to the operation of the motors.

The pressure of the fluid within the tank may be atmospheric pressure.

The tank can have a volume of between 0.75 and 1.25 L, although the invention is not limited to a particular capacity.

Preferably, the tank is arranged so that the hydraulic pump operates under load. For example, the tank is arranged above the hydraulic pump so that fluid transfer from the tank to the pump is achieved by gravity. This can eliminate the need for a suction system to convey fluid from the tank to the pump.

Controllable Valves

Preferably, the controllable valves are electrically controlled.

The valves can be unidirectional. They are preferably proportional, but in a variant they can be on/off. The valves can then be opened at closed with high frequency.

The valves can be direct drive valves (DEW).

Preferably, the controllable valves are servo valves. These valves allow the flow rate to be adjusted with high accuracy and a short response time.

The valves can each have a fluid flow rate of less than or equal to 7 L/min and a fluid pressure of less than or equal to 400 bar during operation.

Each motor can comprise a single controllable valve in series with it.

Hydraulic Motors

Each hydraulic motor is configured to rotate a propeller, the rotation speed of the propeller being dependent on the supply flow rate of fluid to the hydraulic motor, and the torque delivered by the hydraulic motor being a function of the fluid pressure at the inlet of the hydraulic motor.

Hydraulic motors are preferably high-speed motors.

The hydraulic motors are preferably configured to rotate the propellers at a speed between 300 and 7000 rpm, preferably between 2100 and 4000 rpm.

The hydraulic motors can be selected to deliver a torque of between 0.1 and 3.0 N·m each.

The pressure of the fluid at the inlet of the hydraulic motor can be between 50 and 400 bar, preferably between 250 and 300 bar. The pressure of the fluid at the outlet of the hydraulic motor can be atmospheric pressure.

The hydraulic motors can be of any type, including piston, vane or gear motors, preferably piston motors, in particular axial piston motors. Such axial piston motors offer great mechanical power in relation to their low weight.

The hydraulic motors can be of fixed displacement. Compared to variable displacement hydraulic motors, such fixed displacement hydraulic motors have simplified operation and reduced power consumption.

The hydraulic motors can have a generally cylindrical external shape, for example with a length between 10 and 15 cm and a diameter between 2 and 4 cm.

The hydraulic motors can be two-way.

Cooling of the Fluid

The drone can comprise at least one heat exchanger to cool the hydraulic fluid, in particular at the outlet of the hydraulic motors and/or pressure limiters. This makes t possible to control the temperature of the fluid, as the latter tends to heat up during operation of the drone.

Preferably, the drone comprises a plurality of exchangers, in particular one per path. The exchangers can be positioned on arms of the drone, close to the propellers, so as to be located in the air flow generated by the rotation of the propellers. Preferably, in this case, the exchangers are positioned so as to be located in the zone where the air flow generated by the rotation of the propellers is maximum.

When the exchangers are integrated into the arms of the drone, they are advantageously used to help reinforce the rigidity of the arms and thus the overall structure of the drone.

The cooled hydraulic fluid leaving the exchangers can be directed to the inlet of the fluid tank.

The pressure of the fluid within the heat exchangers can be atmospheric pressure. This makes it easier to manufacture the exchangers, which do not have to withstand high pressure.

Pressure Limiter(s)

The drone can include at least one pressure limiter to limit the pressure of the fluid at the inlet of the controllable valve to a predefined limit value called a limited pressure, in particular between 250 and 300 bars.

Preferably, the drone comprises a plurality of pressure limiters, in particular one per path, each limiter being positioned in particular upstream of the controllable valve.

When the pressure of the hydraulic fluid at the outlet of the hydraulic pump exceeds the predefined limit value, the excess pressure can be diverted to the low pressure circuit, in particular to the inlet of the heat exchanger(s).

High-Pressure Hydraulic Circuit

The drone can comprise a high-pressure hydraulic circuit between the outlet of the hydraulic pump and the inlet of the hydraulic motors. For example, the pressure of the hydraulic fluid in the high-pressure hydraulic circuit is between 250 and 300 bar.

Low-Pressure Hydraulic Circuit

The drone can comprise a low-pressure hydraulic circuit between the outlets of the hydraulic motors and of the pressure limiters and the tank inlet.

For example, the pressure of the hydraulic fluid in the low-pressure hydraulic circuit is atmospheric pressure.

Method of Operation

The invention also relates to a method for operating a multi-rotor hydraulic drone, in which method:

to take off, the speed of the pump drive motor is increased beyond a threshold making the pressure limiter active and the pump drive speed is then maintained at a constant value above this threshold, the pressure at the inlet of the controllable valve then being equal to a predefined value imposed by the pressure limiter, during the flight, each controllable valve is operated so as to modify the orientation of the drone as needed, while the pressure limiter is active and maintains the pressure at the inlet of the valve at said predefined value.

BRIEF DESCRIPTION OF THE DRAWINGS

The invention will be better understood upon reading the following detailed description of non-limiting exemplary embodiments and upon examining the attached drawing, in which.

DETAILED DESCRIPTION

Figure 1:
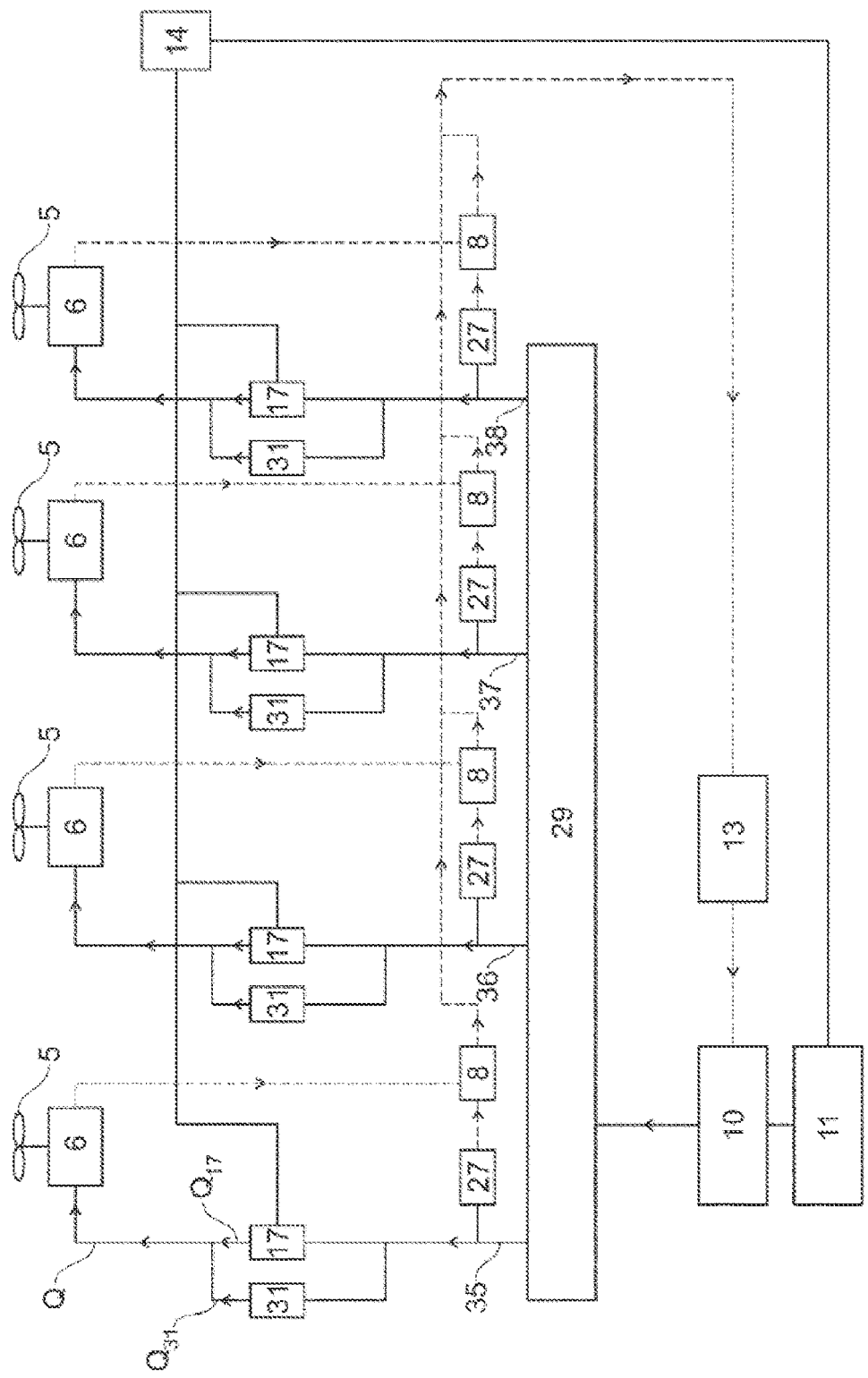
FIG. 1 schematically shows an example of a drone according to the invention.

FIG. 1 shows schematically various components forming a multi-rotor hydraulic drone 1 according to the invention. In this figure, the solid lines correspond to the high-pressure part of the hydraulic circuit, while the dashed lines correspond to the low-pressure part of the hydraulic circuit.

In this example, the drone 1 is a quadcopter and has four hydraulic motors 6 each driving a propeller 5 directly. In a variant, the drone can be hexacopter or octocopter, among other possibilities.

Figure 15:
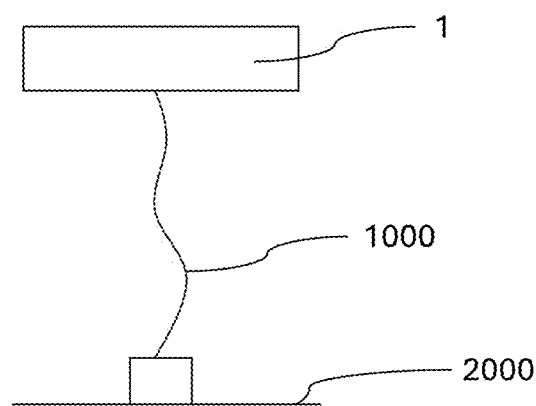
FIG. 15 shows the drone of FIG. 3 supplied with electrical power by a cable.

The drone 1 has a hydraulic pump 10 driven by an electric motor 11. As shown in FIG. 15, the drone 1 may be supplied with electrical power from the ground 2000 by a cable 1000.

The pump 10 is supplied at the inlet with a hydraulic fluid contained in a storage tank 13 and pressurizes this fluid in order to supply the motors 6.

The pressurized fluid leaving the pump 10 is distributed by means of a flow divider 29 between a plurality of paths 35, 36, 37, 38 for adjusting the power of the hydraulic motors 6, each path supplying pressurized fluid to a corresponding motor 6. In the example shown in FIG. 1, the pressurized fluid leaving the pump 10 is thus distributed between four paths so as to supply the same number of hydraulic motors 6.

Each path comprises a proportionally controllable valve 17, which allows the flow rate of the pressurized fluid supply and thus the rotation speed of the associated propeller 5 to be varied at the inlet of the corresponding motor 6. Preferably, the controllable valve 17 is a direct electrically controlled servo valve.

The drone 1 comprises a flight controller 14 configured to control the speed of the drive motor 11 of the pump 10 and the opening of each valve 17 according to the flight speed and the orientation to be given to the drone in particular.

The valve 17 can be moved, in response to an electrical control signal from the flight controller 14, from a first position to a second position, so as to increase the flow rate of pressurized fluid through the valve 17.

Each path comprises a bypass in parallel with the valve 17, this bypass comprising a calibrated orifice 31 chosen to deliver a substantially constant flow rate of pressurized fluid to the inlet of the corresponding motor 6.

Each path has a pressure limiter 27 upstream of the valve 17 and the calibrated orifice 31, The pressure limiter 27 is used to limit the pressure of the fluid at the inlet of the valve 17 to a predefined and substantially constant value, regardless of the pressure upstream of the limiter, provided this value is large enough to make the limiter active. The operating speed of the pump 10 is sufficient to allow the pressure limiter to be active regardless of the position of the valve 17.

Each motor 6 is associated with a heat exchanger 8, which receives at its inlet the fluid leaving the motor 6 and the pressure limiter 27 and which delivers the cooled fluid to the storage tank.

When the drive motor 11 is electric, as in the example shown, the flight controller 14 controls a speed variator which is preferably switchable (not shown) and makes it possible to limit the current used and therefore the torque imposed by the pump 10.

The flight controller 14 advantageously comprises a microcontroller or other computer (not shown) making it possible to ensure a certain number of functions in an autonomous way, such as the maintenance of the drone 1 in a hovering or quasi-hovering position depending on measurement data coming from sensors installed on the drone 1, such as sensors of wind speed and also roll, pitch and yaw angles.

Figure 2:
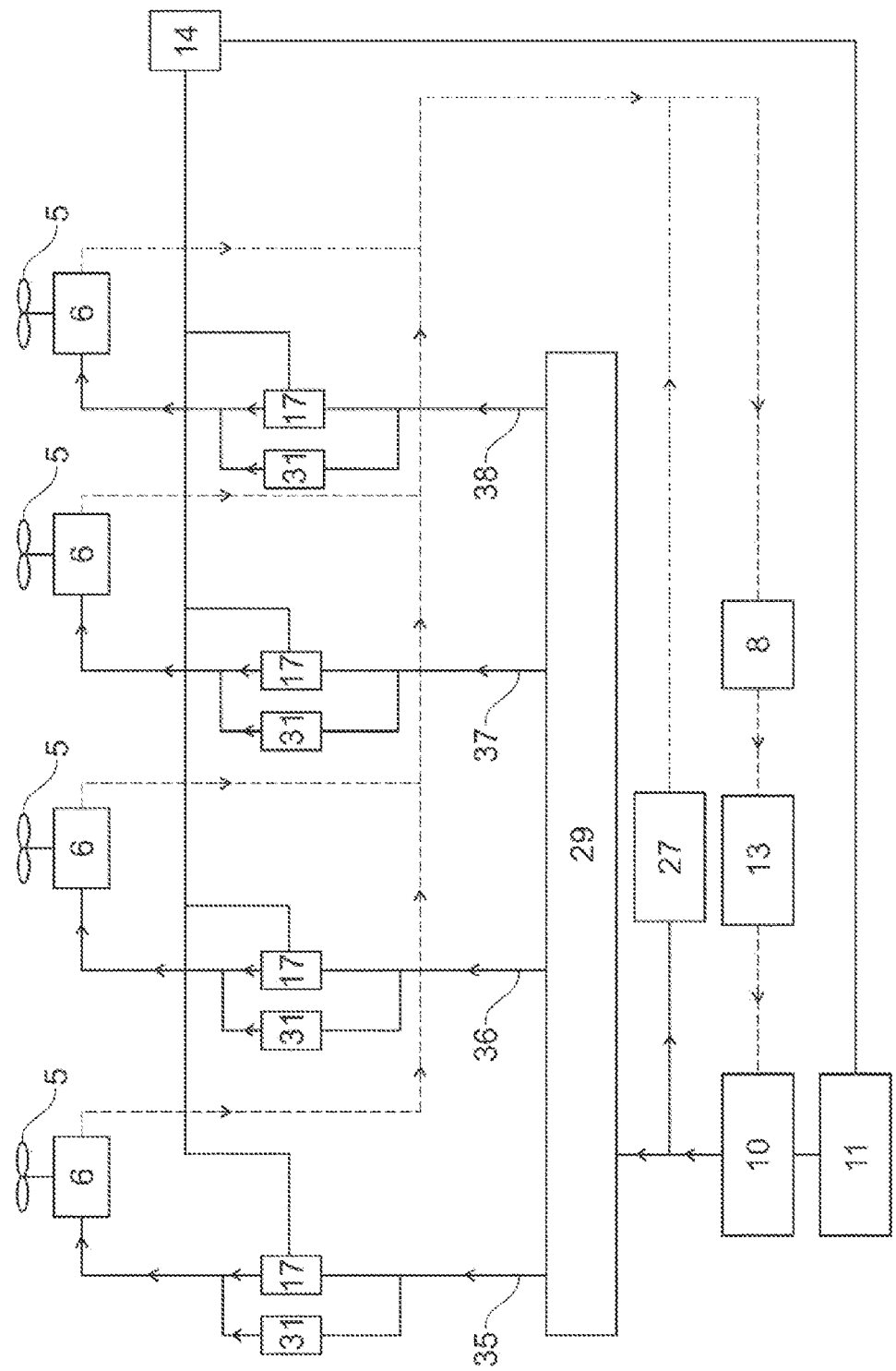
FIG. 2 is a view similar to FIG. 1 of a variant of the drone.
Figure 3:
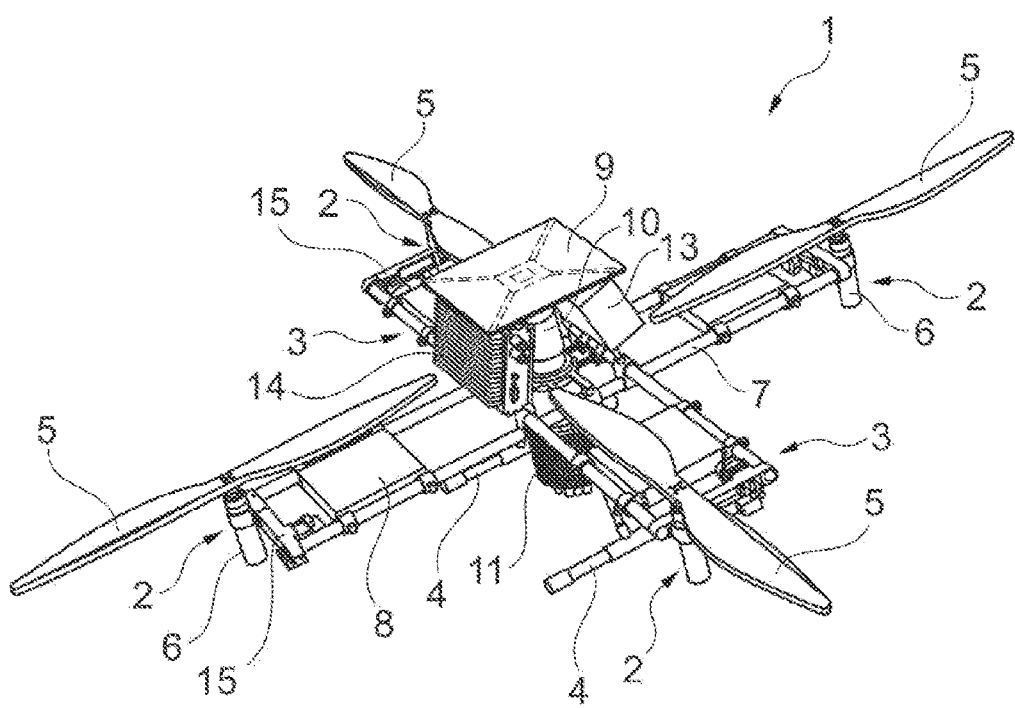
FIG. 3 shows schematically and partially, in perspective, a multi-rotor hydraulic drone according to an exemplary embodiment of the invention.
Figure 4:
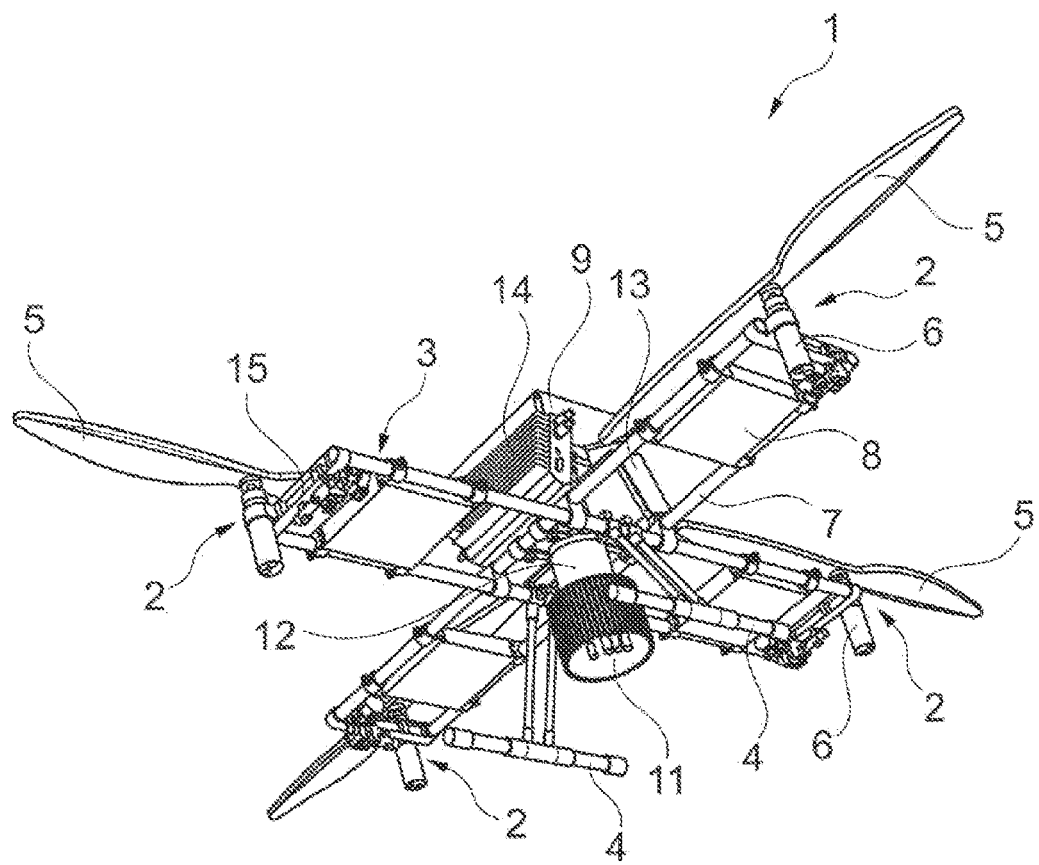
FIG. 4 shows the drone of FIG. 3 from a different viewing angle.
Figure 5:
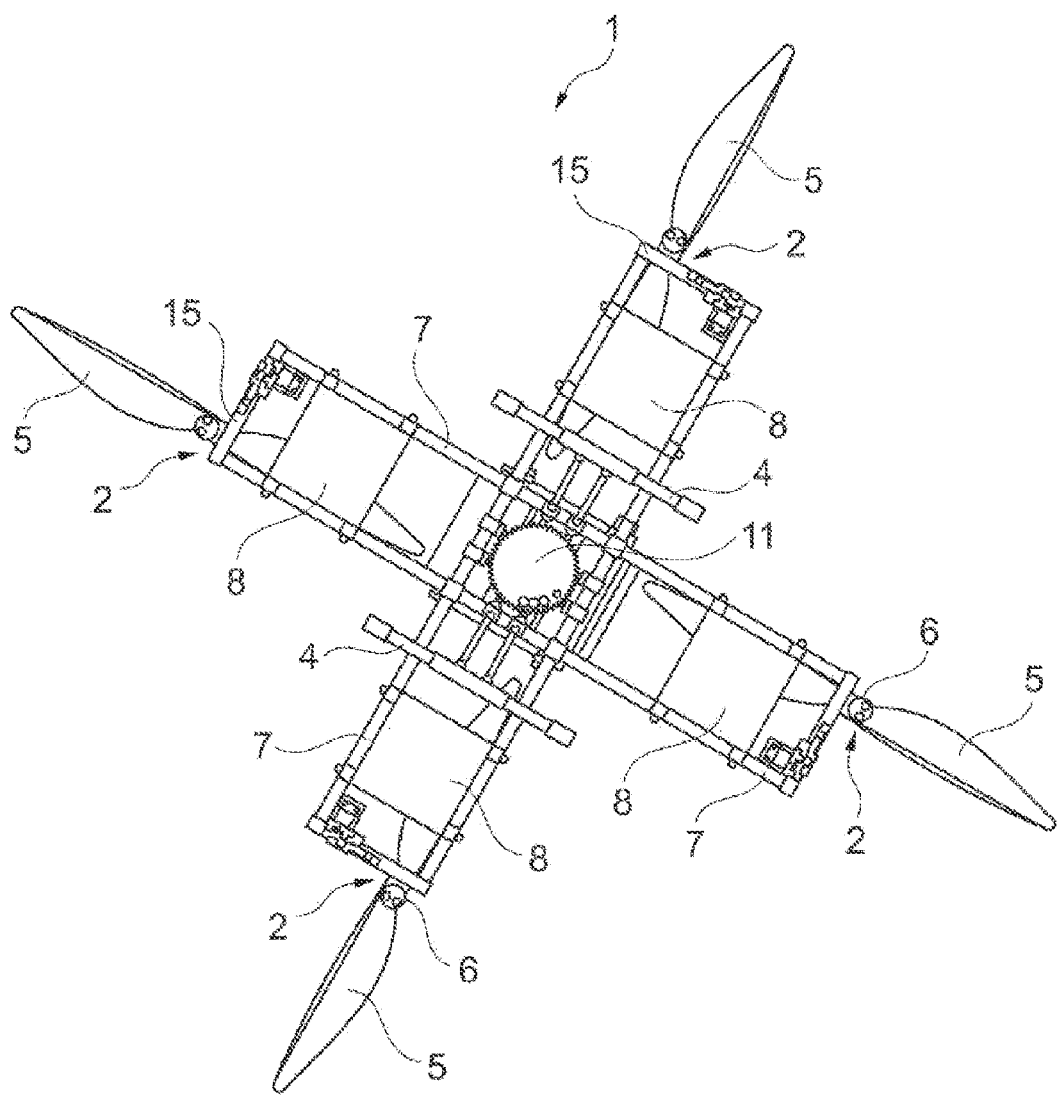
FIG. 5 shows the drone of FIG. 3 from below.
Figure 6:
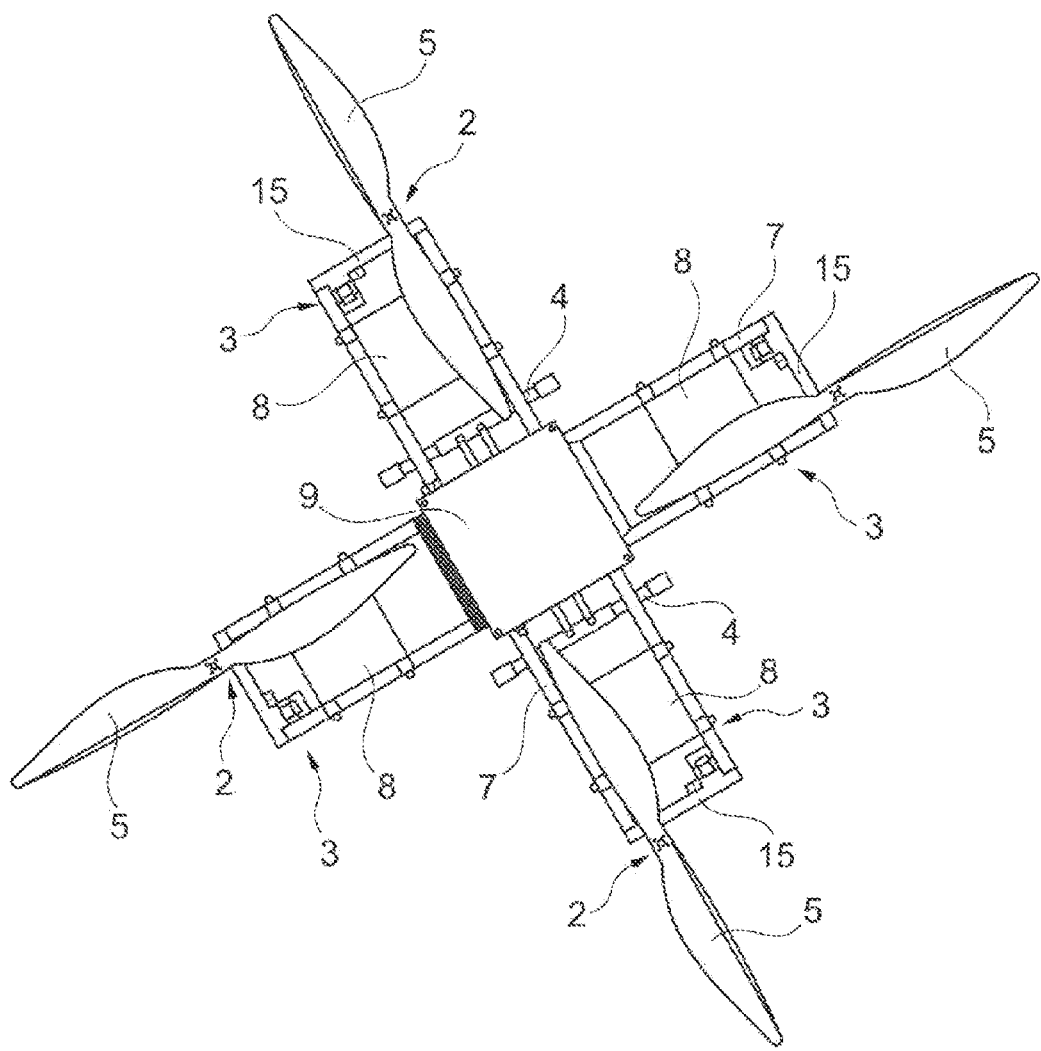
FIG. 6 shows the drone of FIG. 3 from above.
Figure 7:
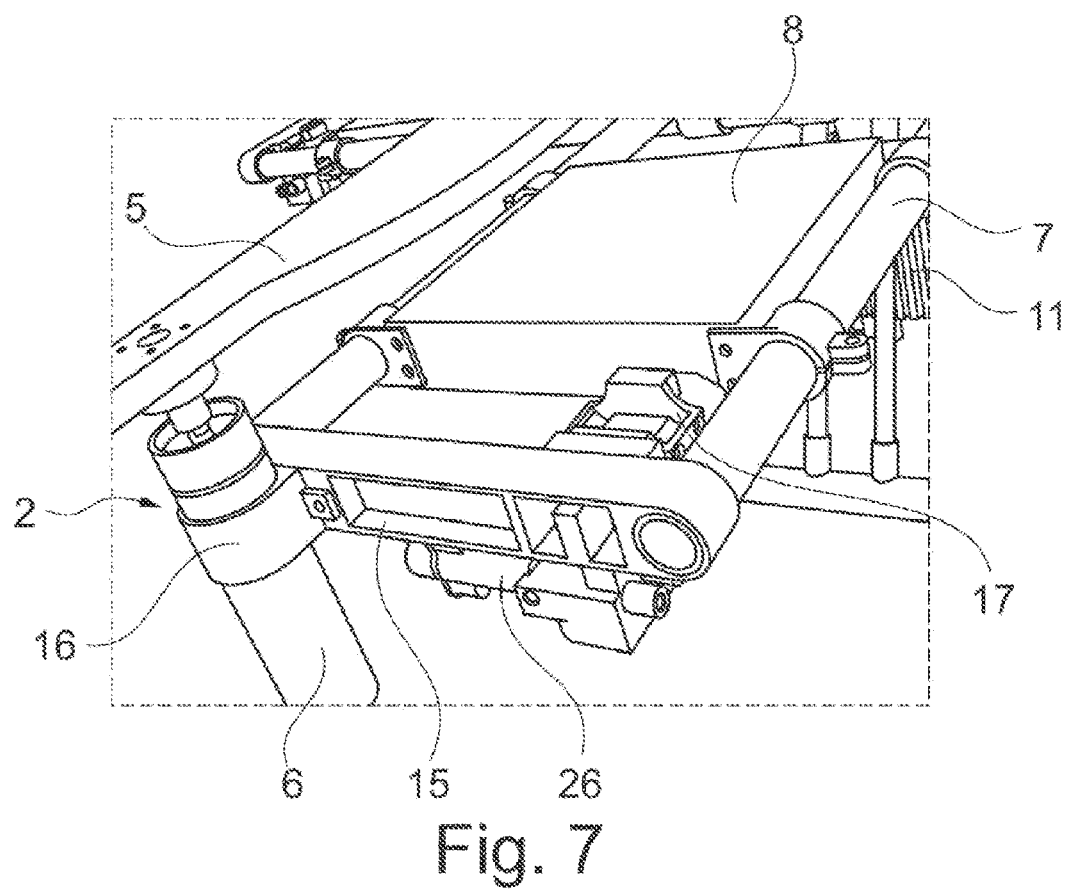
FIG. 7 shows an example of a hydraulic motor support.
Figure 8:
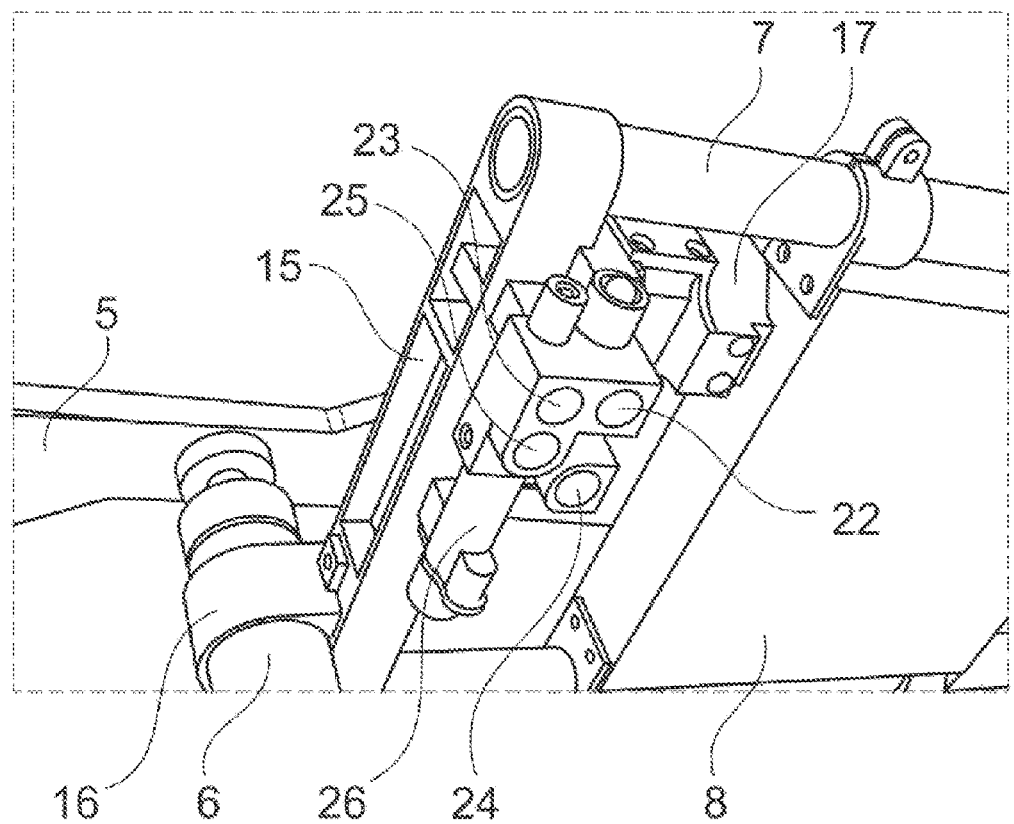
FIG. 8 shows a view from below of the support of FIG. 7.
Figure 9:
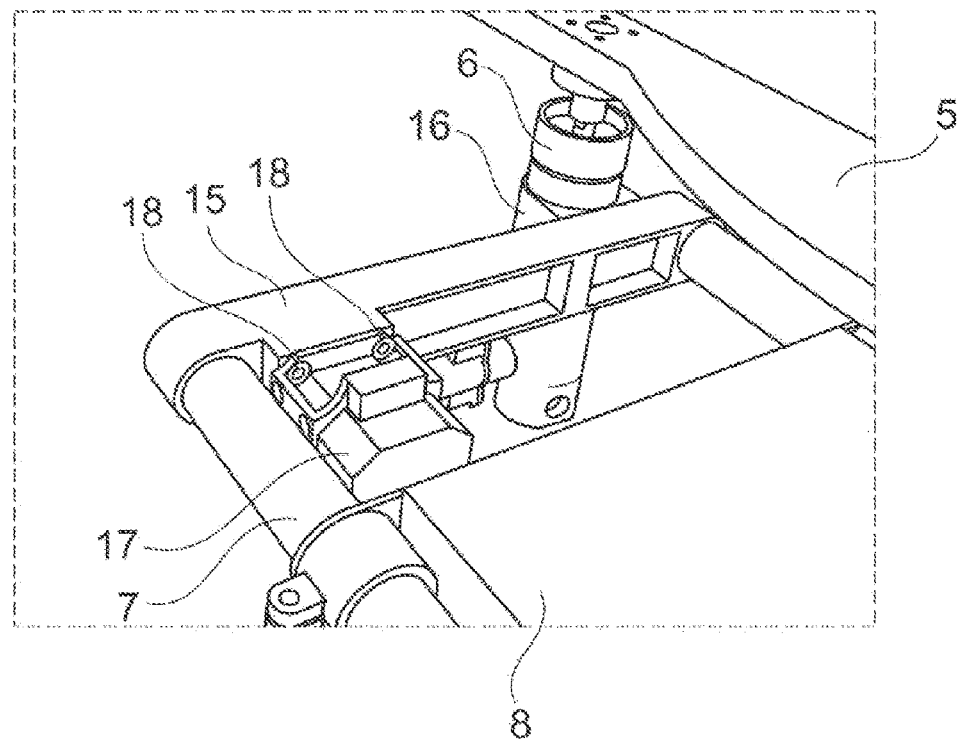
FIG. 9 shows a design detail of the support.

In the variant shown in FIG. 2, the drone 1 comprises a single pressure limiter 27 positioned between the outlet of the pump 10 and the inlet of the flow divider 29. Similarly, the drone 1 may comprise a single heat exchanger 8, positioned between the outlet of the hydraulic motors 6 and the inlet of the tank 13.

In an exemplary operation the drone 1, the supply flow rate of pressurized fluid at the inlet of each motor 6 is such that:

$Q=Q_{31}+Q_{17}$ and $Q_{31}=r*Q$ with, $0.5 \leq r \leq 1$ for example, where

Q: supply flow rate of pressurized fluid at the inlet of each motor 6, $Q_{31}$: flow rate of pressurized fluid at the outlet of element 31, and $Q_{17}$: flow rate of pressurized fluid at the outlet of the controllable valve 17.

The controllable valve 17 can be selected to be completely closed in the first position, so that the entire supply flow rate of pressurized fluid to the inlet of each motor 6 comes from the bypass with the calibrated orifice 31. When the controllable valve 17 is open in the second position, the supply flow rate of pressurized fluid to the inlet of each motor 6 comes partly from the valve and partly from the bypass. For example, half of the flow rate is provided by the valve 17 and the other half by the bypass An example of the arrangement of the constituent components of a multi-rotor hydraulic drone 1 according to the invention is illustrated in FIGS. 3 to 6.

In this example, the drone 1 is a quadcopter and has four arms 3 each carrying a rotor. The drone 1 can rest on the ground by two feet 4 connected to the arms 3.

The hydraulic motors 6 each have a rotor 2 driving a propeller 5, and are each supported by a corresponding arm 3.

A cowling 9 houses the pump 10 and the electric (hive motor 11 of the pump 10, the coupling between the pump 10 and its electric motor 11 being protected by a housing 12, The pump 10 and its electric motor 11 are preferably, as illustrated, positioned vertically in the center of the drone 1.

The arms 3 and feet 4 of the drone 1 are formed by an assembly of tubes 7, for example made of carbon. These tubes can be used to conduct hydraulic fluid, when possible.

Each arm can comprise parallel tubes.

The heat exchangers 8 are each integrated within a corresponding arm 3, and stiffen the latter by connecting the tubes 8.

As shown in FIGS. 7 to 10, each arm 3 carries at its end a support 15 in which the corresponding hydraulic motor 6 is fixed. The support 15 can be mounted, as shown, at the end of the tubes and can connect them.

Each support 15 has a collar 16 on its outer side, in which the hydraulic motor 6 is engaged and can support the corresponding controllable valve 17 on its inner side.

Figure 10:
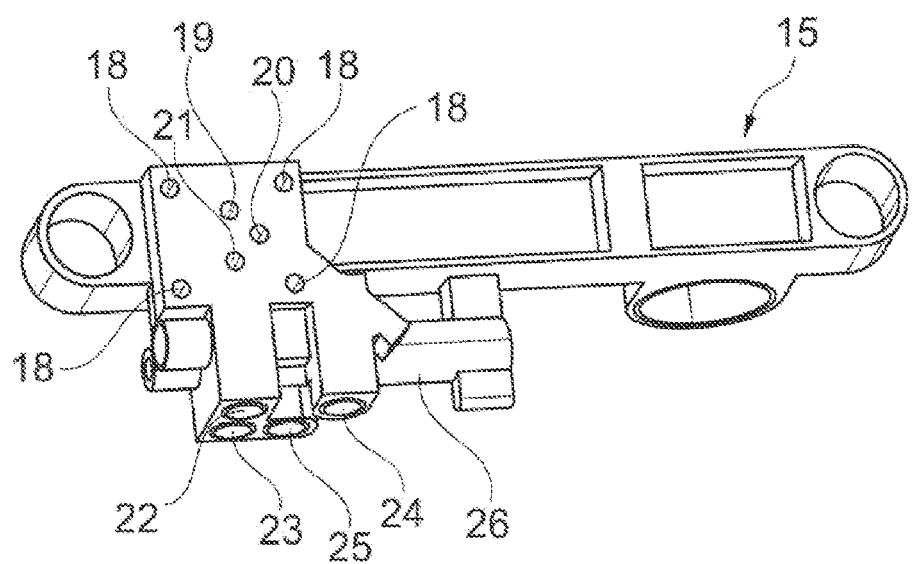
FIG. 10 shows another design detail of the support.

As illustrated in FIG. 10, each support 15 may have on its inner side, on the one hand, holes 18 for fixing the corresponding valve 17, and, on the other hand, orifices 19, 20 and 21 respectively for leakage, outflow and inflow of fluid.

On its lower side, each support 15 has orifices 22, 23, 24 and 25 respectively for the admission of fluid from the pump 10, the sending of fluid to the corresponding heat exchanger 8, the outflow of fluid to the corresponding hydraulic motor 6, and the return of fluid from the corresponding hydraulic motor 6.

The orifices 22 and 24 are connected to hydraulic hoses (not shown), which are resistant to high pressure. The orifices 23 and 25 are connected to hydraulic hoses (not shown), which are not subject to high pressure and may be less resistant.

Each support 15 has a tube 26 receiving the corresponding pressure limiter 27.

Figure 11:
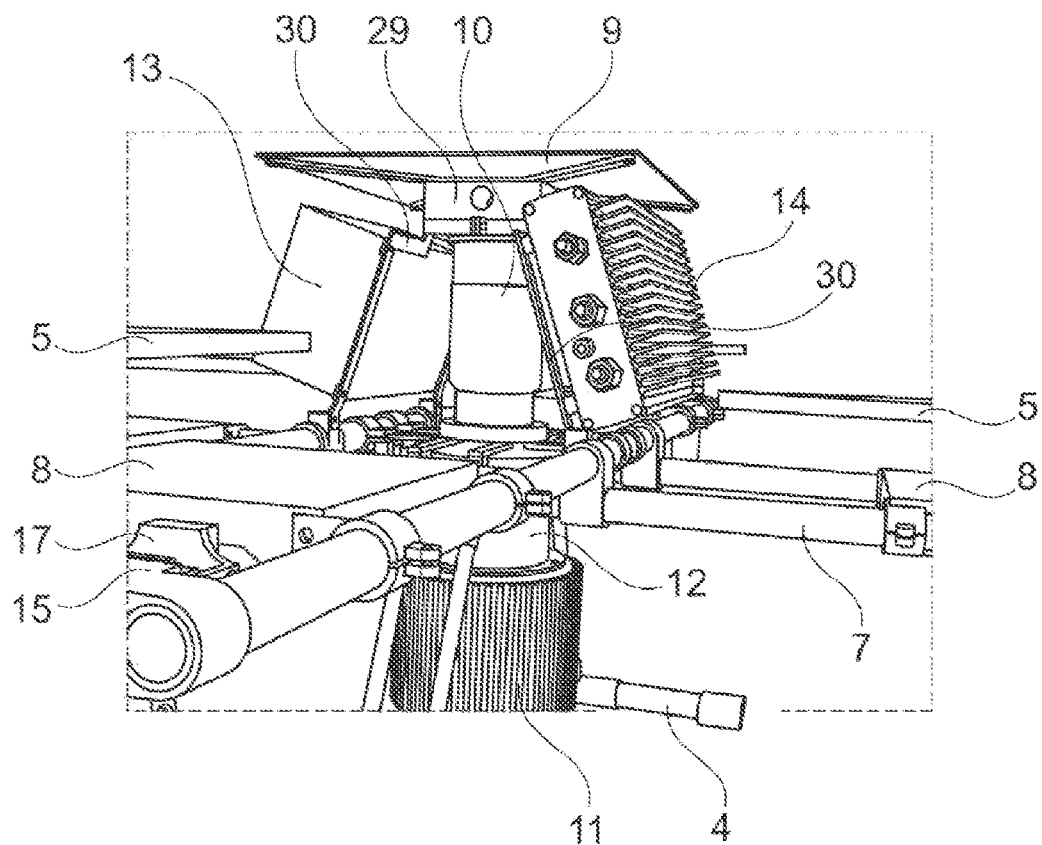
FIG. 11 shows a design detail of the drone, FIG. 12 schematically shows another example of a drone according to another aspect of the invention.

As shown in FIG. 11, the cowling 9 is attached via a connecting element 28 to the flow divider 29, which can be formed as shown by a perforated block that accommodates the outlet of the pump 10. The connecting element 28 is for example cross-shaped.

Support plates 30 are fixed on the one hand to the perforated block 29 and on the other hand to the arms 3 and make it possible to hold the fluid tank 13 and the flight controller 14.

Figure 12:
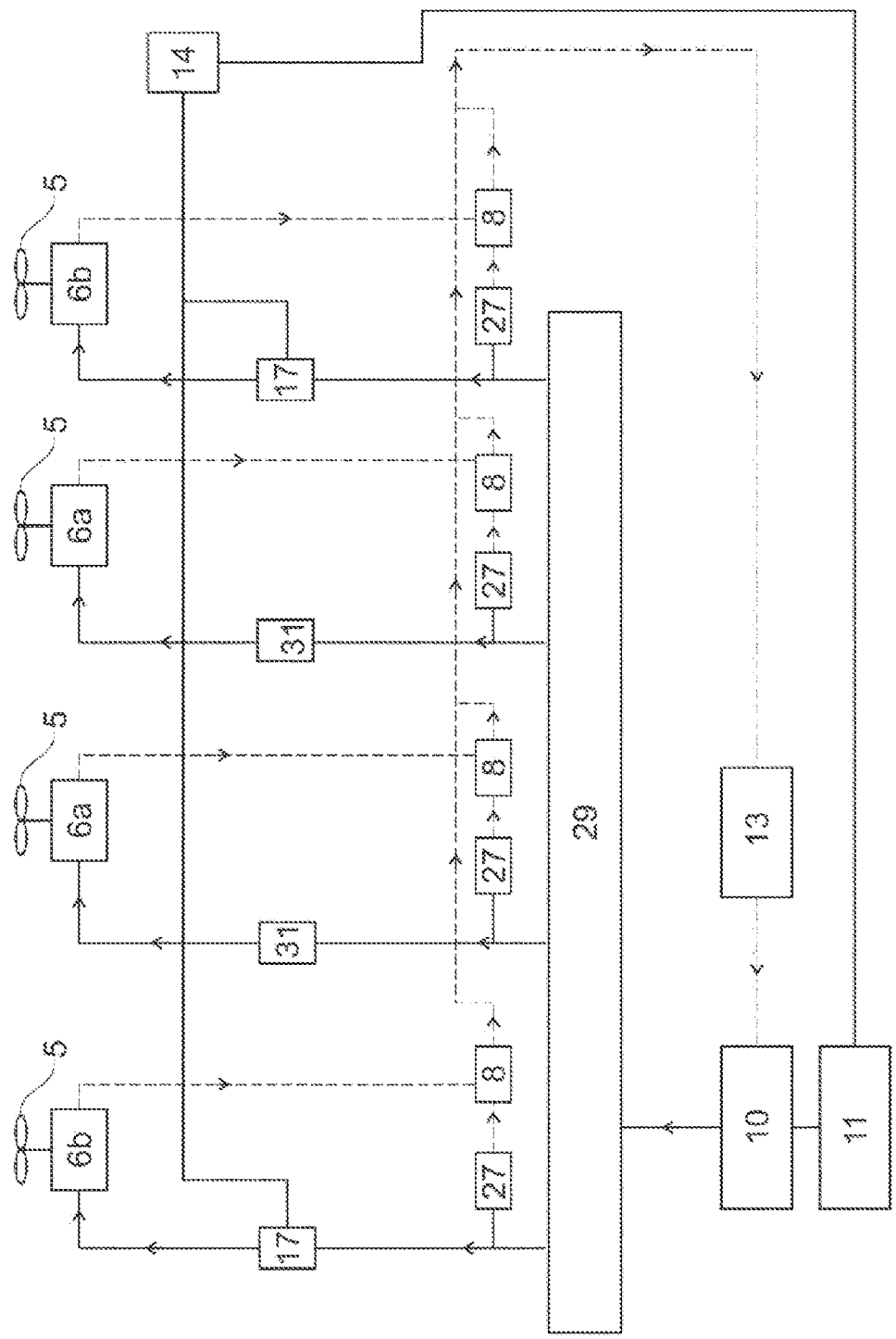

The drone 1 shown in FIG. 12 has a plurality of hydraulic lift motors 6a and a plurality of hydraulic orientation motors 6b. In FIG. 12, only two lift motors 6a and two orientation motors 6b have been shown, in order to simplify understanding of the figure.

Each of the hydraulic lift motors 6a comprises a supply path comprising a calibrated orifice 31 connected in series with the corresponding motor 6a in such a way that each of the motors 6a receives a predefined constant supply flow rate, this supply flow rate being able to correspond to a flow rate allowing each of the lift motors 6a to be driven in rotation at a speed sufficient to produce a thrust ensuring just the lift of the drone 1.

Each of the hydraulic orientation motors 6b comprises a supply path with a controllable valve 17 connected in series with the corresponding motor 6b, the valve 17 being controllable between a closed position and a maximum open position to control the supply flow rate to each of the orientation motors 6b.

Each of the lift motors 6a can receive a predefined constant supply flow rate making it possible to ensure the lift of the drone 1 while the orientation motors 6b are stopped, the valves 17 being in the closed position. By playing on the degree of opening of the valves 17, it is possible to vary the rotation speed of the orientation motors 6b and thus to control the orientation of the drone and/or to stabilize it, i.e. to maintain it in stationary or quasi-stationary position.

Figure 13:
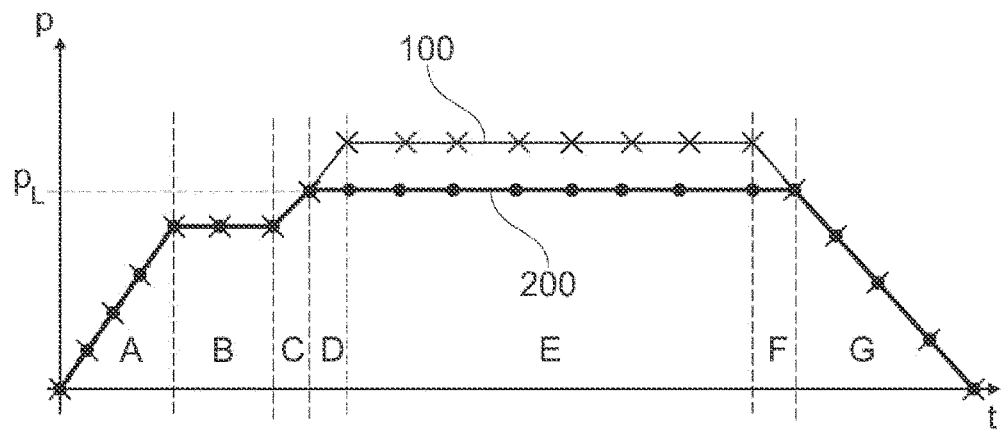
FIG. 13 is a graph showing an example of the development of the hydraulic pressure at the inlet of the controllable valve and of the pressure at the outlet of the hydraulic pump as a function of time during the operation of the drone according to the invention.
Figure 14:
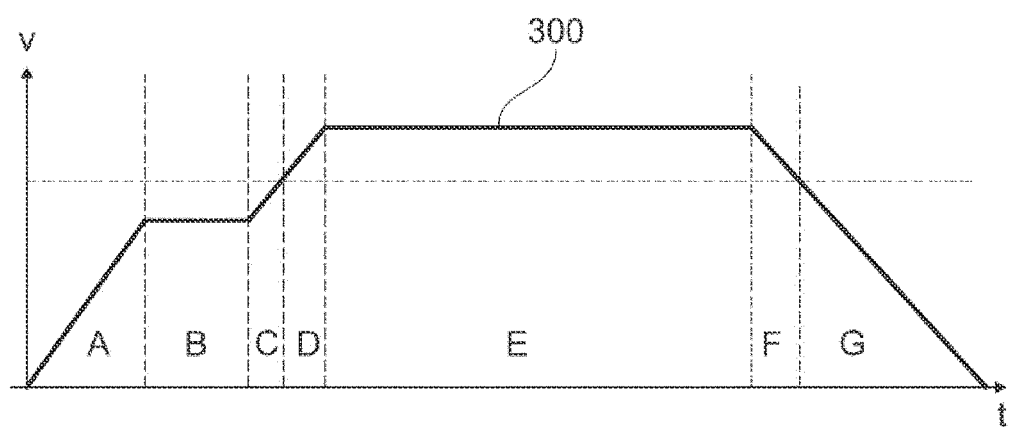
FIG. 14 is a graph showing the development of the speed of the pump drive motor as a function of time during the operation illustrated in FIG. 13.

Reference will now be made to FIGS. 13 and 14 to describe the operation of a drone according to the first aspect of the invention, all of the motors of which are connected in series with a controllable valve and receive a non-zero flow rate of fluid when the valve is in the first position, as is the case with drones of which the hydraulic circuits are illustrated in FIGS. 1 and 2.

FIG. 13 shows the development 100 of the pressure p at the outlet of the hydraulic pump 10 as a function of time t and the development 200 of the pressure p at the inlet of the controllable valve 17 and of the calibrated orifice 31 as a function of time t.

FIG. 14 shows the development 300 of the speed v of the drive motor 11 of the hydraulic pump 10 as a function of time t.

In a first step A, the hydraulic motors 6 are started. To do this, the speed of the drive motor 11 of the hydraulic pump 10 is increased according to its torque capabilities so as to increase the pressure of the fluid at the outlet of the hydraulic pump 10 and at the inlet of the controllable valve 17 and of the calibrated orifice 31.

Then, in step B, the drone 1 is waiting to take off. In this step B, the speed of the drive motor 11 of the hydraulic pump 10 remains constant. The rotation speed of the hydraulic motors 6 is then close to that necessary to ensure the takeoff of the drone 1.

In order to make the drone take off, which corresponds to step C, the speed of the drive motor 11 of the hydraulic pump 10 is further increased according to its torque capacities so as to increase the pressure of the fluid at the outlet of the hydraulic pump 10 until this pressure reaches a predefined limit value allowed by the pressure limiters 27, called a limited pressure $p_L$.

Then, in step D, the speed of the drive motor 11 of the hydraulic pump 10 is further increased according to its torque capabilities so as to increase the pressure of the fluid at the outlet of the hydraulic pump 10 to a value higher than the limited pressure $p_L$ allowed by the pressure limiters 27. The pressure limiter 27 makes it possible to have the limited pressure $p_L$ at the inlet of the controllable valve 17 and of the bypass comprising the calibrated orifice 31. This limited pressure $p_L$ is transformed, through the calibrated orifice 31, into a constant idle flow rate which ensures a rotation speed of the hydraulic motors 6 sufficient to produce a thrust necessary for the lift of the drone 1.

During the next step E, the speed of the drive motor 11 of the hydraulic pump 10 is constant so that the fluid pressure at the outlet of the hydraulic pump 10 and at the inlet of the controllable valve 17 and the calibrated orifice 31 are constant. In this step F, the hydraulic pump 10 generates a pressure higher than the limited pressure $p_L$ allowed by the pressure limiter 27. Thus, the pressure of the fluid at the outlet of the hydraulic pump 10 is higher than the pressure at the inlet of the controllable valve 17 and of the calibrated orifice 31.

In this step E, the speed of the drive motor 11 of the hydraulic pump 10 associated with the necessary torque defines the nominal power needed for the drive motor 11. This nominal power is in a range typically defined around 1.6 times the power necessary to ensure the lift of the drone 1. Setting the nominal power of the drive motor 11 of the hydraulic pump 10 to this value ensures that the drive motor 11 meets the durability requirements without excessive fatigue, because the drive motor 11 will not exceed this nominal power, regardless of the operating mode of the drone. Moreover, this range makes it possible to ensure all the power variation needs of the hydraulic motors 6, whatever the flight conditions defined as acceptable for the drone 1, such as the speed of the wind gusts against which the drone 1 must be able to respond and remain stable.

In this step E, the control of the valves 17 via the flight controller 14 makes it possible to ensure the stability of the drone 1. The valves 17 make it possible to modulate the supply flow rate of the hydraulic motors 6, thus ensuring a modification of the rotation speed according to the need defined by the flight controller 14, in particular through control algorithms.

To descend, which corresponds to step F, the rotation speed of the hydraulic motors 6 is modulated by acting on the valves 17 and by decreasing the speed of the drive motor 11 of the hydraulic pump 10 to ensure the landing of the drone 1.

Lastly, in a step G, while the drone 1 is on the ground, the speed of the drive motor 11 of the hydraulic pump 10 is further reduced in order to ensure a gradual shutdown of the motors, and the valves 17 are deactivated.

Of course, the invention is not limited to the examples described above. For example, the pump may be driven by a heat engine.

The invention claimed is:

1. A multi-rotor hydraulic drone comprising:
hydraulic motors configured to receive a fluid;
propellers configured to be driven by the hydraulic motors;
a hydraulic pump configured to pressurize the fluid provided to the hydraulic motors; and
a supply system comprising:
paths configured to provide the pressurized fluid to respective hydraulic motors; and
valves configured to control a flow rate of the pressurized fluid through the paths to the respective hydraulic motors, in order to control a speed of the respective hydraulic motors,
wherein when the valves are in a first position, the pressurized fluid is provided to the respective hydraulic motors at a non-zero idle flow rate, and when the valves are in a second position of greater opening than the first position, the pressurized fluid is provided to the respective hydraulic motors at a flow rate that is greater than the idle flow rate.

2. The drone of claim 1, the hydraulic motor that receives the fluid at the idle flow rate when the valve is in the first position is connected in series with this valve.

3. The drone of claim 1, further comprising a pressure limiter configured to limit the pressure of the pressurized fluid in the supply system to a predetermined limit value.

4. The drone of claim 1, further comprising bypasses connected in parallel with the valves, the bypasses configured to provide the pressurized hydraulic fluid to the hydraulic motors at the idle flow rate, when the valves are in the first position.

5. The drone of claim 4, wherein the valves are closed when in the first position, such that all of the pressurized hydraulic fluid is provided to the hydraulic motors through the bypasses.

6. The drone of claim 1, wherein the drone is configured to be supplied with electrical power from the ground by a cable.

7. The drone of claim 1, wherein the hydraulic motors comprise axial piston motors having a fixed displacement.

8. The drone of claim 3, further comprising supports, wherein the hydraulic motor, the valves, and the pressure limiter are attached to the supports.

9. The drone of claim 1, further comprising a heat exchanger configured to cool the fluid.

10. The drone of claim 9, wherein the heat exchanger receives the fluid from outlets of the hydraulic motors.

11. The drone of claim 1, further comprising a flight controller configured to control the valves, such that for the hydraulic motors are operated at a desired rotation speed.

12. The drone of claim 1, further comprising a tank configured to receive the fluid from the hydraulic motors and provide the fluid to the hydraulic pump.

13. The drone of claim 12, wherein the tank is arranged so that the hydraulic pump is provided with the fluid and operates under a load.

14. The drone of claim 4, wherein the bypasses each comprise a calibrated orifice.

15. The drone of claim 1, further comprising a flow divider configured to receive the pressurized fluid from the hydraulic pump and supply pressurized fluid to each of the paths.

16. A multi-rotor hydraulic drone comprising:
propellers;
hydraulic orientation motors and hydraulic lift motors configured to drive the propellers;
a hydraulic pump configured to pressurize a fluid provided to the hydraulic orientation motors and the hydraulic lift motors;
paths configured to provide the pressurized fluid to the hydraulic lift motors and the hydraulic orientation motors;
valves configured to control a flow rate of the pressurized fluid through the paths to the hydraulic orientation motors, such that the pressurized fluid may be provided to the hydraulic orientation motors at a first flow rate when the valves are in a first position and at a higher second flow rate when the valves are in a second position of greater opening than the first position; and
calibrated orifices configured to control a flow rate of the pressurized fluid through the paths to the hydraulic lift motors, such that the pressurized fluid is provided to the lift motors at a constant flow rate.

17. A method for operating a multi-rotor hydraulic drone comprising:
hydraulic motors configured to receive a fluid;
propellers configured to be driven by the hydraulic motors;
a hydraulic pump configured to pressurize the fluid provided to the hydraulic motors;
a supply system comprising:
paths configured to provide the pressurized fluid to respective hydraulic motors; and valves configured to control a flow rate of the pressurized fluid through the paths to the respective hydraulic motors, in order to control a speed of the respective hydraulic motors; and a pressure limiter configured to limit the pressure of the pressurized fluid in the supply system to a predetermined limit value, wherein when the valves are in a first position, the pressurized fluid is provided to the respective hydraulic motors at a non-zero idle flow rate, and when the valves are in a second position, the pressurized fluid is provided to the respective hydraulic motors at a flow rate that is greater than the idle flow rate, the method comprising:

during takeoff, operating the hydraulic pump at a speed that pressurizes the fluid to a pressure that exceeds a threshold pressure, and reducing the pressure of the fluid, such that the pressure limiter operates to reduce the pressure of the pressurized fluid to at least the threshold pressure, before the pressurized fluid is provided to the valves; and during the flight, operating the valves, so as to vary a flow rate of the pressurized fluid to the hydraulic motors and modify the orientation of the drone, while the pressure limiter maintains the pressure of the pressurized fluid provided to the valves at the threshold pressure.

* * * * *